US010967260B2

(12) United States Patent
Pajaro

(10) Patent No.: US 10,967,260 B2
(45) Date of Patent: *Apr. 6, 2021

(54) METHOD FOR IMPROVING GAME STREAMING PERFORMANCE IN THE CLOUD

(71) Applicant: Sony Interactive Entertainment America LLC, San Mateo, CA (US)

(72) Inventor: Cliff Pajaro, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/569,174

(22) Filed: Sep. 12, 2019

(65) Prior Publication Data

US 2020/0001179 A1 Jan. 2, 2020

Related U.S. Application Data

(63) Continuation of application No. 14/883,919, filed on Oct. 15, 2015, now Pat. No. 10,449,448.

(51) Int. Cl.
*A63F 13/31* (2014.01)
*A63F 13/355* (2014.01)
*A63F 13/352* (2014.01)
*A63F 13/44* (2014.01)

(52) U.S. Cl.
CPC .......... *A63F 13/355* (2014.09); *A63F 13/352* (2014.09); *A63F 13/44* (2014.09); *A63F 13/31* (2014.09)

(58) Field of Classification Search
CPC .... H04L 29/06034; A63F 13/30; A63F 13/31; A63F 13/32; A63F 13/323; A63F 13/33; A63F 13/35; A63F 13/358; A63F 13/45; A63F 13/48; A63F 13/49; A63F 13/70–73; A63F 13/79
See application file for complete search history.

(56) References Cited

U.S. PATENT DOCUMENTS

| | | | |
|---|---|---|---|
| 8,613,673 B2 | 12/2013 | Perry et al. | |
| 8,926,435 B2 | 1/2015 | Perry et al. | |
| 2014/0344283 A1 | 11/2014 | Nicholls | |
| 2015/0066613 A1 | 3/2015 | Zhou et al. | |
| 2015/0134840 A1 | 5/2015 | Thompson et al. | |
| 2015/0238875 A1 | 8/2015 | Fear | |
| 2015/0375113 A1* | 12/2015 | Justice | A63F 13/77 463/42 |
| 2016/0294973 A1 | 10/2016 | Bakshi et al. | |
| 2017/0106280 A1 | 4/2017 | Pajaro | |
| 2017/0208125 A1 | 7/2017 | Jai et al. | |
| 2017/0282075 A1 | 10/2017 | Michot et al. | |
| 2017/0354884 A1 | 12/2017 | Benedetto et al. | |

* cited by examiner

*Primary Examiner* — Omkar A Deodhar
(74) *Attorney, Agent, or Firm* — John L. Rogitz

(57) ABSTRACT

A cloud gaming manager selects a game server to stream a computer game to a requesting client game console based on which server in the cloud system has the requested game in server memory, or the requested game system in server memory, or the user files of the requesting console in server memory.

21 Claims, 3 Drawing Sheets

METHOD FOR IMPROVING GAME STREAMING PERFORMANCE IN THE CLOUD

FIELD

The application relates generally to improving computer game streaming performance in the cloud gaming environment.

BACKGROUND

As computer gaming grows in popularity, games have been developed in which remote players can play cloud-based games, i.e., the game files, textures, etc. are executed in a remote server on the Internet based on input commands from a gamer's console with the outputs of the server game being sent to the gamer's console. As understood herein, players may undesirably experience prolonged game loading times in such an environment.

SUMMARY

Accordingly, in a first aspect a device has a computer memory that is not a transitory signal and that includes instructions executable by a processor to receive, from a first computer game device (CGD), a first request for data related to a first computer game. The instructions are executable to assign, as source of the first computer game for the first CGD, a first server system based on a determination that the first server system has a same system software as used by the first CGD in solid state memory of the first server, and/or a determination that the first server system has the first computer game in solid state memory of the first server, and/or a determination that the first server system has user files associated with the first CGD in solid state memory of the first server.

In examples, the instructions can be executable to determine that the first server system has a same system software as used by the first CGD in solid state memory of the first server, and determine that a second server has the first computer game in solid state memory of the second server. The first server is assigned as source of the first computer game for the first CGD based on a determination that a storage size of the same system software as used by the first CGD is larger than a storage size of the first computer game. On the other hand, the second server is assigned as source of the first computer game for the first CGD based on a determination that a storage size of the same system software as used by the first CGD is less than a storage size of the first computer game.

In a similar vein, the instructions may be executable to determine that the first server system has a same system software as used by the first CGD in solid state memory of the first server, and determine that a second server has the user files associated with the first CGD in solid state memory of the second server. The first server can be assigned as source of the first computer game for the first CGD based on a determination that a storage size of the same system software as used by the first CGD is larger than a storage size of the user files, whereas the second server can be assigned as source of the first computer game for the first CGD based on a determination that a storage size of the same system software as used by the first CGD is less than a storage size of the user files.

Along these lines, the instructions can be executable to determine that the first server system has the first computer game in solid state memory of the first server, and determine that a second server has the user files associated with the first CGD in solid state memory of the second server. The first server can be assigned as source of the first computer game for the first CGD based on a determination that a storage size of the first computer game is larger than a storage size of the user files. In contrast, the second server can be assigned as source of the first computer game for the first CGD based on a determination that a storage size of the first computer game is less than a storage size of the user files.

If desired, the instructions can be executable to determine that the first server system has predetermined data in solid state memory by determining that the first server system used the predetermined within a predetermined prior period of time.

A method is also disclosed implementing the above instructions.

In another aspect, a computer-implemented cloud gaming manager is programmed with instructions to select a game server to stream a computer game to a requesting client game console based on which server in a cloud system has the requested game in server memory, and/or select a game server to stream the computer game to the requesting client game console based on which server in the cloud system has the requested game system in server memory, and/or select a game server to stream the computer game to the requesting client game console based on which server in the cloud system has the user files of the requesting client game console in server memory.

The details of the present application, both as to its structure and operation, can best be understood in reference to the accompanying drawings, in which like reference numerals refer to like parts, and in which:

DETAILED DESCRIPTION

Figure 1:
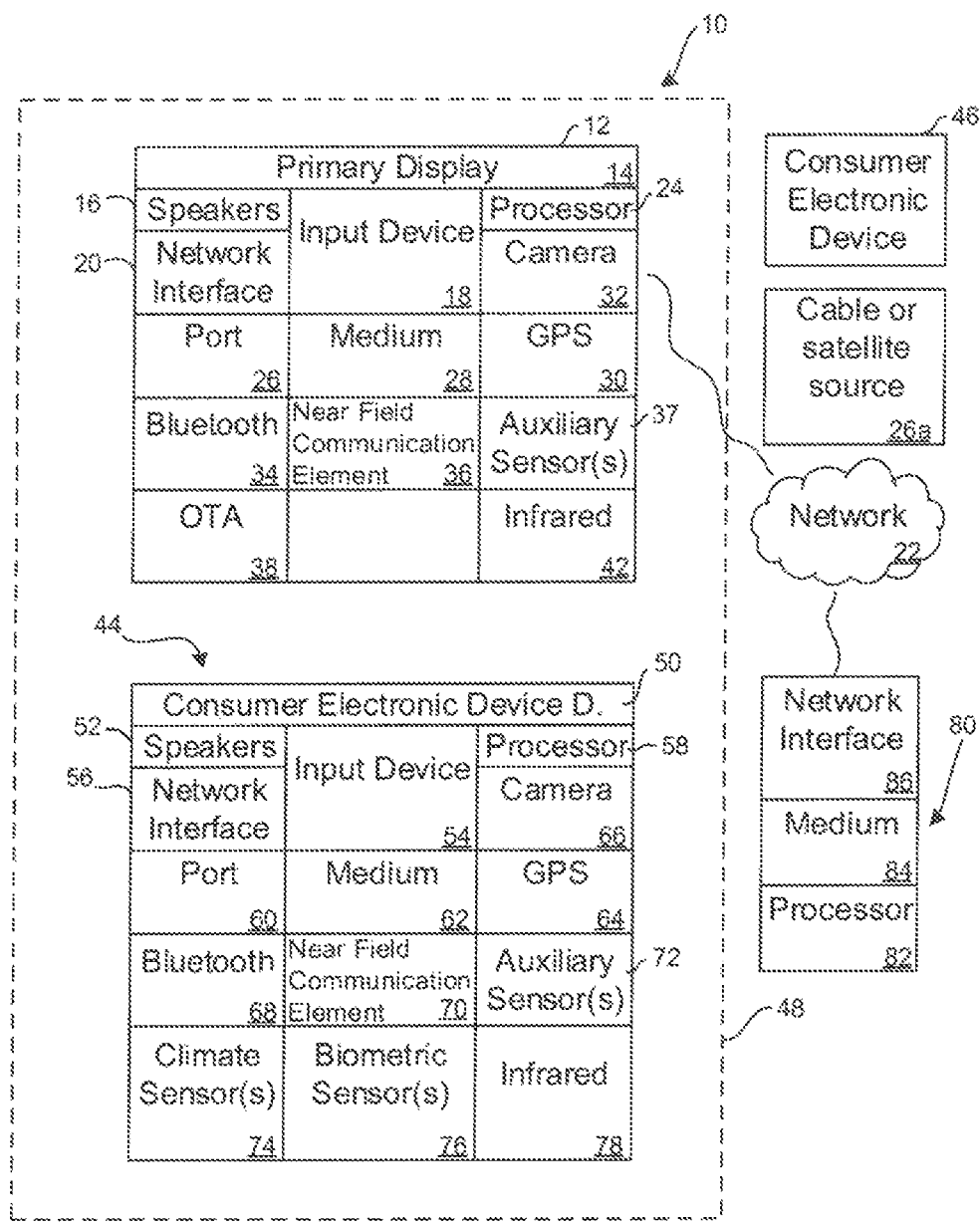
FIG. 1 is a block diagram of an example system including an example in accordance with present principles.

This disclosure relates generally to computer ecosystems including aspects of consumer electronics (CE) device networks such as but not limited to distributed computer game networks. A system herein may include server and client components, connected over a network such that data may be exchanged between the client and server components. The client components may include one or more computing devices including game consoles such as Sony Playstation™, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTH TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used. As alluded to above, the CE device 44/46 and/or the source 26a may be implemented by a game console. Or, one or more of the CE devices 44/46 may be implemented by devices sold under the trademarks Google Chromecast, Roku, Amazon FireTV.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVD 12, or it may be a more sophisticated device such as a tablet computer, a game controller communicating via wired or wireless link with a game console implemented by the second CE device 46 and controlling video game presentation on the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver. Typically, the server 80 includes multiple processors in multiple computers referred to as "blades".

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
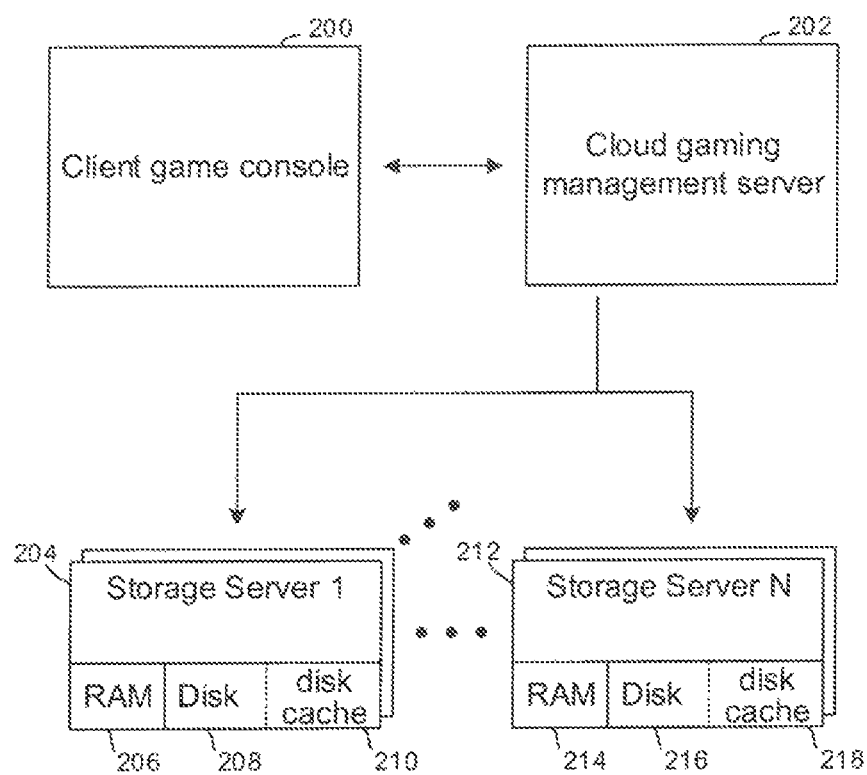
FIG. 2 is a schematic diagram of a cloud-based gaming system.

FIG. 2 illustrates a cloud computer game environment in which one or more client game consoles 200 (also referred to as "game systems", "game devices") such as Sony Playstations, Microsoft xBoxes, etc. communicate over a wired and/or wireless link with a cloud-based gaming management server 202, typically an Internet server. In turn, the management server 202 communicates with a first game server 204 (which may be embodied by multiple server "blades") that includes one or more solid state memories 206 such as a random access memory (RAM) and one or more hard disk drives 208, each of which disk drive 208 typically includes an internal solid state disk cache 210, with the memory 206 not being part of, but communicating with, the disk drive 208. The management server 202 communicates with up to "N" such servers, including an $N^{th}$ game server 212 that includes one or more solid state memories 214, and one or more disk drives 216 with onboard disk cache 218.

In its simplest form, the present disclosure maintains in the server memory 206/214 game-related information that has been recently streamed to a game console from the respective game server, to reduce game loading times when a new game console attempts to conduct cloud-based gaming, and to assign the server to a requesting game console based on the server already having, in its solid state memory, relevant information for the particular game console. For instance, a game console can be assigned to a game server that has recently streamed the same computer game being requested by the console, meaning that the game files, textures, etc. of the requested game are already in the memory of the server and thus can be made available for use to the console much more quickly than if the game files required loading into memory from disk. Or, a game console can be assigned to a game server that has recently streamed gaming information to a console with a software game system that is the same as the software system of the requesting console. Yet again, a game console can be assigned to a game server that has recently streamed gaming information to the same gaming console, on the understanding that user-related data such as saves, user personal profile, etc. are still available in the memory of that server. Note that the management server can be implemented by one of the game servers.

Figure 3:
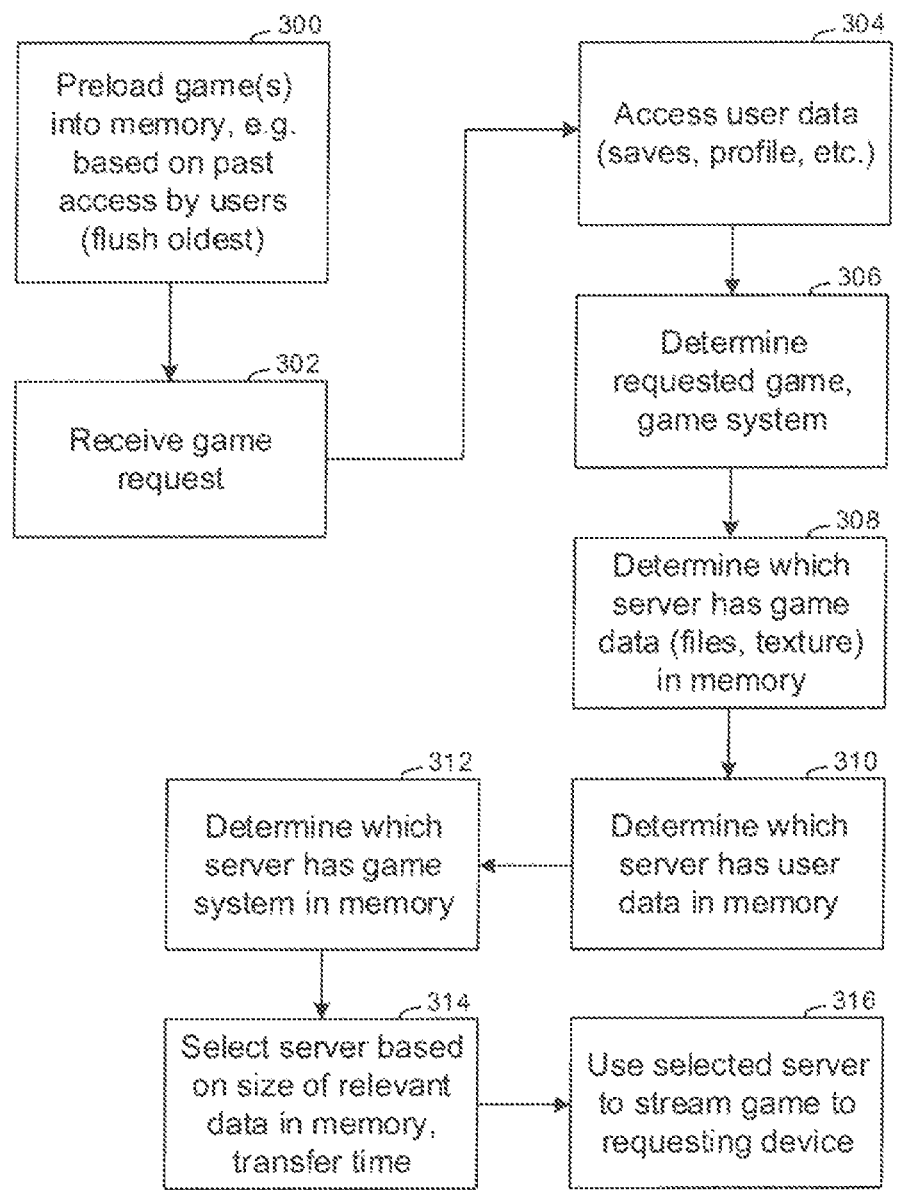
FIG. 3 is a flow chart of example logic.

With these principles in mind, attention is drawn to FIG. 3 for example logic that can be employed. Commencing at block 300, in some embodiments one or more computer games or computer game systems can be pre-loaded in the memory of one or more game servers based on heuristics such as past access of certain games by consoles employing particular software game systems. In the event that memory becomes full, the least recently streamed information can be flushed.

Proceeding to block 203, a request is received from a game console 200 to play a cloud-based computer game. The management server 202 may access at block 304 user data that may already be stored on one or more of the game servers 204, 212. Also, the management server may determine, at block 306, the requested game and the software system (e.g., Playstation-3 or Playstation-4) of the console that made the request received at block 302.

Then, at block 308 the management server determines which game server has gaming files and texture and other game information of the requested game in memory. In ascertaining what is in memory, the management server may access a file allocation table or other data structure listing memory contents. Or, the management server may determine a time a server last streamed a game and on that basis infer that the server still retains the game in memory. In other words, the management server can determine that a game server has the requested game in memory by determining from its management records that the game server streamed the game data within a predetermined prior period of time.

Similar determinations pertaining to which server has user data (data pertaining to a user of the requesting game console) in memory and which server has the game software of the requesting console in memory may be made at blocks 310 and 312, respectively. Then, the management server selects, as the server to stream the game to the requesting console, the server typically having the largest amount of relevant data (be it game files, game system, or user data) in memory. Other data needed for game streaming is then loaded into memory of the selected server, the selected server used at block 316 to stream the game to the requesting console.

Note that in selecting the game server, the management system typically selects the server with the largest amount of relevant data in memory as mentioned above. For example, if a first server contains the user data in memory and the user data consumes 50 mB, while a second server contains game file data in memory and the game file data consumes 500 mB, the second computer typically will be selected, and the user data from the first server sent thereto. However, in some cases transfer times may vary between servers, and depending on historical or actually measured transfer times, it may be determined that a larger amount of data from a first game server can be transferred to a second server with a smaller amount of data in memory than the smaller amount of data in the second server can be streamed to the first server. In such a scenario, the second server may be selected as the server to stream the game.

It will be appreciated that whilst present principals have been described with reference to some example embodiments, these are not intended to be limiting, and that various alternative arrangements may be used to implement the subject matter claimed herein.

What is claimed is:

1. Device comprising:
at least one computer memory that is not a transitory signal and that comprises instructions executable by at least one processor to:
receive, over a network, from a first computer simulation device (CSD) at least a first signal representing a request for data related to a first computer simulation;
identify that at least a first server system among at least first and second server systems will satisfy the request over the network based in part on identifying at least one of three tests, the three tests comprising:
the first server system has a compatible system software as used by the first CSD in memory of the first server;
the first server system has the first computer simulation in memory of the first server;
the first server system has user files associated with the first CSD in memory of the first server, wherein the memory of the first server is different from storage of the first server from whence data that is subject to the request for data related to the first computer simulation is loaded into the memory of the first server.

2. The device of claim 1, comprising the at least one processor coupled to the at least one computer memory and adapted to execute the instructions.

3. The device of claim 1, wherein the instructions are executable to:
assign as source of the first computer simulation for the first CSD the first server system based on a determination that the first server system has a compatible system software as used by the first CSD in solid state memory of the first server.

4. The device of claim 1, wherein the instructions are executable to:
assign as source of the first computer simulation for the first CSD the first server system based on a determination that the first server system has the first computer simulation in solid state memory of the first server.

5. The device of claim 1, wherein the instructions are executable to:
assign as source of the first computer simulation for the first CSD the first server system based on a determination that the first server system has user files associated with the first CSD in solid state memory of the first server.

6. The device of claim 1, wherein the instructions are executable to:
determine that the first server system has a compatible system software as used by the first CSD in solid state memory of the first server;
determine that the second server system has the first computer simulation in solid state memory of the second server;
assign the first server system as source of the first computer simulation for the first CSD based on a determination that a storage size of the compatible system software as used by the first CSD is larger than a storage size of the first computer simulation; and
assign the second server system as source of the first computer simulation for the first CSD based on a determination that a storage size of the compatible system software as used by the first CSD is less than a storage size of the first computer simulation.

7. The device of claim 1, wherein the instructions are executable to:
determine that the first server system has a compatible system software as used by the first CSD in solid state memory of the first server system;
determine that the second server system has the user files associated with the first CSD in solid state memory of the second server system;
assign the first server system as source of the first computer simulation for the first CSD based on a determination that a storage size of the compatible system software as used by the first CSD is larger than a storage size of the user files; and
assign the second server system as source of the first computer simulation for the first CSD based on a determination that a storage size of the compatible system software as used by the first CSD is less than a storage size of the user files.

8. The device of claim 1, wherein the instructions are executable to:
determine that the first server system has the first computer simulation in solid state memory of the first server;
determine that the second server system has the user files associated with the first CSD in solid state memory of the second server;
assign the first server as source of the first computer simulation for the first CSD based on a determination that a storage size of the first computer simulation is larger than a storage size of the user files; and
assign the second server as source of the first computer simulation for the first CSD based on a determination that a storage size of the first computer game is less than a storage size of the user files.

9. The device of claim 1, wherein the instructions are executable to determine that the first server system has predetermined data in solid state memory by determining that the first server system used the predetermined data within a predetermined prior period of time.

10. A computer-implemented cloud simulation manager programmed with instructions to:
 select a simulation server to stream a computer simulation over a network to a requesting client console based on at least one of three tests, the three tests comprising:
 which server in a cloud system has the requested simulation loaded in server memory,
 which server in the cloud system has the requested simulation system loaded in server memory,
 which server in the cloud system has user files of the requesting client console loaded in server memory, wherein the server memory is different from at least one disk drive communicating data to the server memory.

11. The computer-implemented cloud simulation manager of claim 10, wherein the computer-implemented cloud simulation manager is programmed to select a simulation server to stream a computer simulation to a requesting client console based on which server in a cloud system has the requested simulation in server memory.

12. The computer-implemented cloud simulation manager of claim 10, wherein the computer-implemented cloud simulation manager is programmed to select a simulation server to stream the computer simulation to the requesting client console based on which server in the cloud system has the requested simulation system in server memory.

13. The computer-implemented cloud simulation manager of claim 10, wherein the computer-implemented cloud simulation manager is programmed to select a simulation server to stream the computer simulation to the requesting client console based on which server in the cloud system has the user files of the requesting client console in server memory.

14. A method comprising:
 receiving over a network from a first computer simulation device (CSD) at least a first request related to a first computer simulation;
 assigning as source to respond to the request from the first CSD a first server system based on identifying at least one three identifications, the three identifications comprising:
 the first server system has a compatible system software as used by the first CSD in memory of the first server;
 the first server system has the first computer simulation in memory of the first server;
 the first server system has user files associated with the first CSD in memory of the first server, wherein the memory of the first server is different from storage of the first server from whence data that is subject of the first request is loaded into the memory of the first server.

15. The method of claim 14, comprising assigning as source of the first computer simulation for the first CSD the first server system based on a determination that the first server system has a compatible system software as used by the first CSD in solid state memory of the first server.

16. The method of claim 14, comprising assigning as source of the first computer simulation for the first CSD the first server system based on a determination that the first server system has the first computer simulation in solid state memory of the first server.

17. The method of claim 14, comprising assigning as source of the first computer simulation for the first CSD the first server system based on a determination that the first server system has user files associated with the first CSD in solid state memory of the first server.

18. The method of claim 14, comprising:
 determining that the first server system has a compatible system software as used by the first CSD in solid state memory of the first server system;
 determining that a second server has the first computer simulation in solid state memory of the second server;
 assigning the first server system as source of the first computer simulation for the first CSD based on a determination that a storage size of the compatible system software as used by the first CSD is larger than a storage size of the first computer simulation; and
 assigning the second server as source of the first computer simulation for the first CSD based on a determination that a storage size of the compatible system software as used by the first CSD is less than a storage size of the first computer simulation.

19. The method of claim 14, comprising:
 determining that the first server system has a compatible system software as used by the first in solid state memory of the first server system;
 determining that a second server has the user files associated with the first CSD in solid state memory of the second server;
 assigning the first server system as source of the first computer simulation for the first CSD based on a determination that a storage size of the compatible system software as used by the first CSD is larger than a storage size of the user files; and
 assigning the second server as source of the first computer simulation for the first CSD based on a determination that a storage size of the compatible system software as used by the first CSD is less than a storage size of the user files.

20. The method of claim 14, comprising:
 determining that the first server system has the first computer simulation in solid state memory of the first server system;
 determining that a second server has the user files associated with the first CSD in solid state memory of the second server;
 assigning the first server system as source of the first computer simulation for the first CSD based on a determination that a storage size of the first computer simulation is larger than a storage size of the user files; and
 assigning the second server as source of the first computer simulation for the first CSD based on a determination that a storage size of the first computer simulation is less than a storage size of the user files.

21. The method of claim 14, comprising:
 determining that the first server system has predetermined data in solid state memory by determining that the first server system used the predetermined data within a predetermined prior period of time.

* * * * *